Patented Mar. 9, 1926.

1,576,394

UNITED STATES PATENT OFFICE.

HARRY WOOD, OF SOUTH FORK, PENNSYLVANIA.

SIZING COMPOSITION.

No Drawing. Application filed August 6, 1924. Serial No. 730,498.

*To all whom it may concern:*

Be it known that I, HARRY WOOD, a citizen of the United States, residing at South Fork, in the county of Cambria and State of Pennsylvania, have invented new and useful Improvements in Sizing Compositions, of which the following is a specification.

The present invention relates to a sizing composition, namely, a composition which is suitable for application to plaster walls, in order to render the said walls suitable for being painted, or otherwise decorated. When so applied to walls made of plaster, cement or other porous materials, the said walls will be rendered practically air-tight, that is to say the pores will be largely filled, especially in the surface portion of the plaster walls.

The composition is preferably made up of the following materials, and in the proportions stated:

| | Per cent. |
|---|---|
| Linseed oil (raw or boiled) | 6 |
| Turpentine (spirits or straight) | 5 |
| Soap (any kind of white soap not having excess or free alkali and preferably granulated) | 23 |
| Vinegar (apple) | 3 |
| Japan drier | 6 |
| White lead | 7 |
| Glue (commercial, preferably granulated) | 12 |
| Water (preferably distilled though ordinary water of reasonable purity may be used) | 38 |

In preparing the composition, the above proportions have been found to give very satisfactory results, but these proportions can be varied, more or less, athough the proportion of linseed oil, turpentine, japan drier and water are preferably maitained very close to the proportions above stated, otherwise the result will not be entirely satisfactory.

In preparing the composition, the soap and glue are first boiled together with a sufficient amount of water to produce a thick pasty mass, whereupon the vinegar is added, after which the white lead, linseed oil, turpentine and drier are added (either in the order stated or in any other desired order), or they can first be mixed together and added. All of the ingredients are then mixed by agitation or stirring, and the mixture is then thinned down to the desired consistency, with the remaining portion of the water, to make up 38% of water in all. The mixture can, if desired, be further thinned by the addition of a small quantity of an oil other than kerosene. In a modified form of the process, the vinegar can be added to the mixture after all of the other components have been added, or with the last portion of the water. In some cases it may be impractical to boil the soap and glue together, and in this case these two ingredients can be dissolved in the water either cold or warm, preferably while stirring. However, as above stated, it is preferable that these components be boiled with a portion of the water, as more satisfactory results are thereby produced.

After being mixed, the composition can be put up into suitable containers, such as friction top cans or the like, and can be stored for a considerable period. In such a case, however, it would be advisable to thoroughly mix the composition before applying the same to the wall.

I claim:

1. A composition of matter containing as major ingredients soap and glue in water sufficient to form a vehicle therefor, said three substances amounting in all to substantially over one half of the entire composition, together with minor ingredients namely, linseed oil, turpentine, vinegar, japan drier and white lead, these ingredients each being in amount less than any one of said major ingredients, all of said ingredients being combined in such proportions as to form a sizing compound.

2. A composition of matter suitable for sizing plaster walls, containing about 6% of linseed oil, about 5% of turpentine, about 38% of water, together with soap and glue, capable of being carried in said water as a vehicle, both in amount substantially greater than the amount of linseed oil, and also containing vinegar, japan drier and white lead, the latter three components together forming less than one fifth of the entire mixture.

3. A composition suitable for sizing walls, containing the following materials in approximately the proportions stated, namely:—

| | Per cent. |
|---|---|
| Linseed oil | 6 |
| Turpentine | 5 |
| Soap (not having excess of free alkali) | 23 |
| Vinegar | 3 |
| Japan drier | 6 |
| White lead | 7 |
| Glue | 12 |
| Water | 38 |

In testimony whereof I affix my signature.

HARRY WOOD.